May 28, 1940.     J. MATELA     2,202,706
DEVICE FOR COLLECTING AND REMOVING SLAG IN OPEN HEARTH FURNACES
Filed Oct. 30, 1939     4 Sheets-Sheet 1

INVENTOR.
John Matela
BY
ATTORNEY.

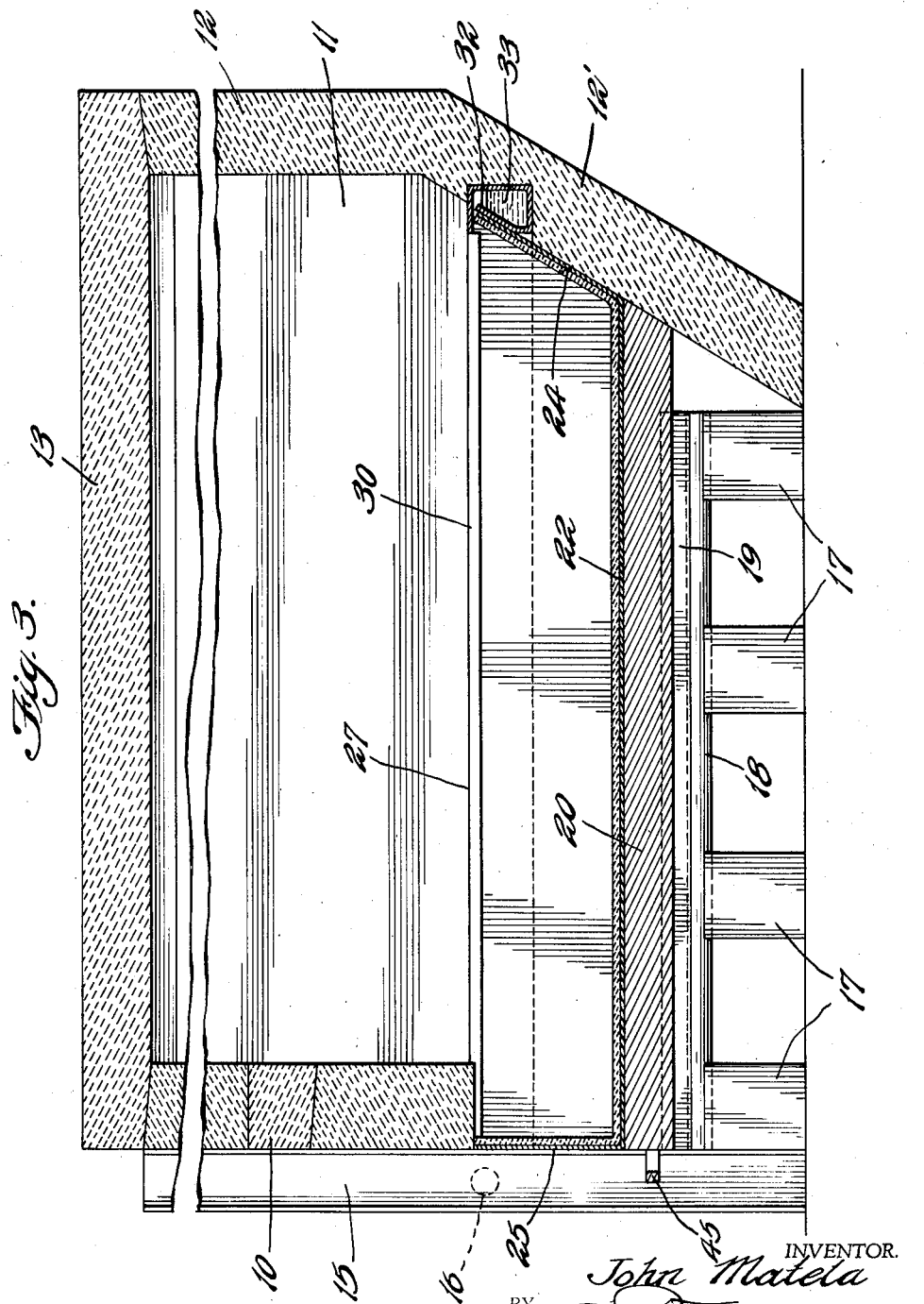

May 28, 1940. J. MATELA 2,202,706
DEVICE FOR COLLECTING AND REMOVING SLAG IN OPEN HEARTH FURNACES
Filed Oct. 30, 1939 4 Sheets-Sheet 3
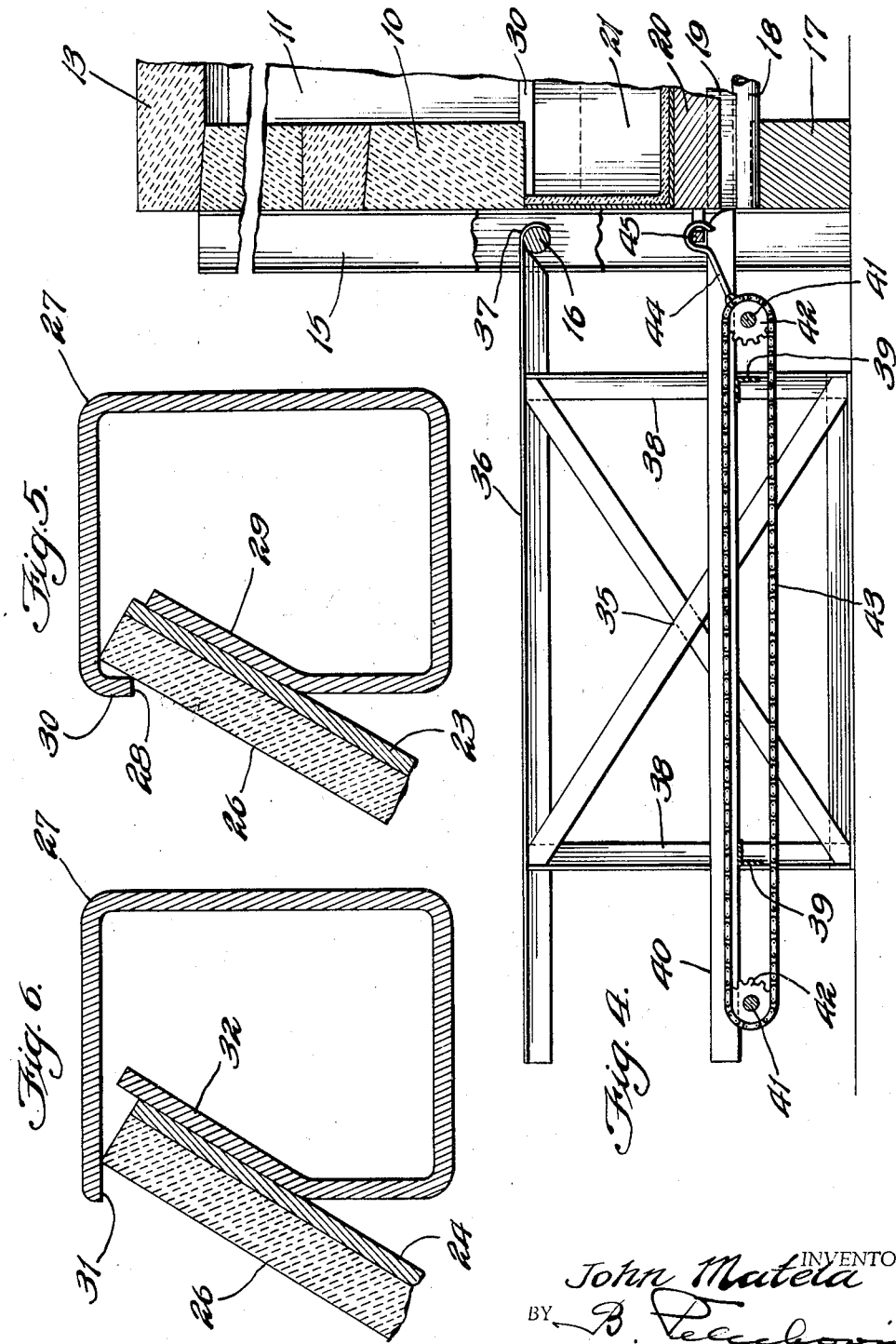
INVENTOR.
John Matela
BY
ATTORNEY.

May 28, 1940. J. MATELA 2,202,706
DEVICE FOR COLLECTING AND REMOVING SLAG IN OPEN HEARTH FURNACES
Filed Oct. 30, 1939 4 Sheets-Sheet 4
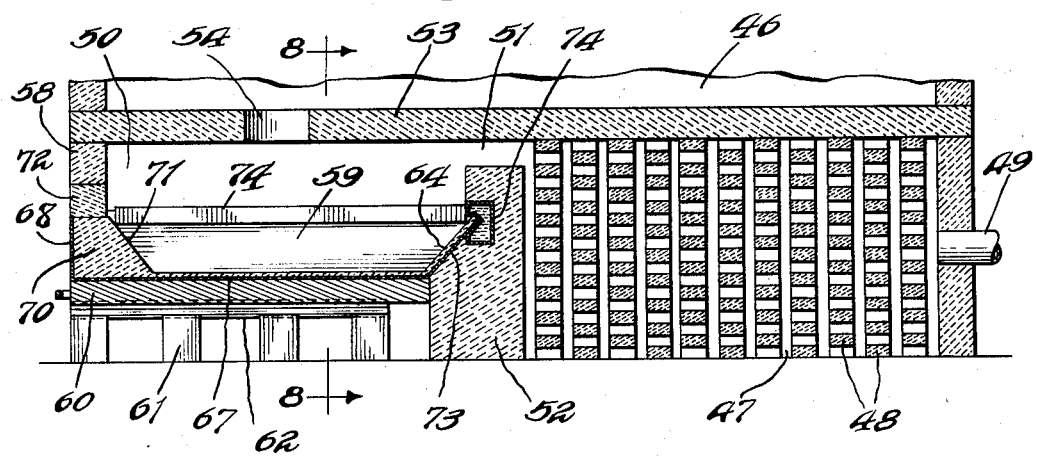
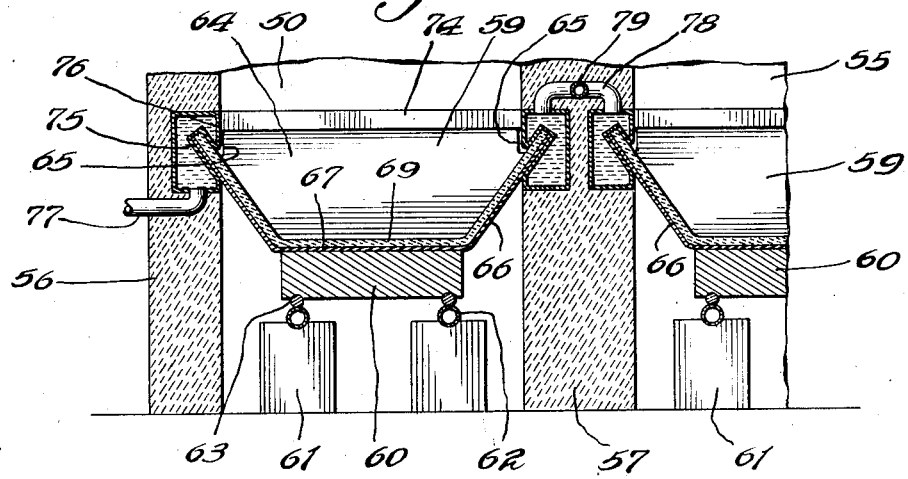
INVENTOR.
John Matela Patented May 28, 1940

2,202,706

UNITED STATES PATENT OFFICE 2,202,706

DEVICE FOR COLLECTING AND REMOVING SLAG IN OPEN HEARTH FURNACES

John Matela, Chicago, Ill., assignor to Walter S. Bednarski, Chicago, Ill., as trustee Application October 30, 1939, Serial No. 301,885

6 Claims. (Cl. 263—45)

The present invention intended for use in connection with open hearth furnaces, has for its principal object the provision of a device for collecting and removing slag.

In open hearth furnaces, bricks or other refractory material with which the walls and flues are lined, form slag when under an intense temperature generated within the furnace, and which slag usually flows to the bottom of the furnace which periodically must be removed with the consequent suspension of the operation of the furnace. Therefore a further object of the present invention is the provision of means whereby slag in open hearth furnaces could be collected and removed therefrom, without interference with the operation of the open hearth furnace.

Another object of the present invention is the provision of a removable bottom for open hearth furnaces.

A still further object of the present invention is the provision of a receptacle, suitably lined with a refractory material to protect the same from oxidation, which may be suitably supported within the lower portion of an open hearth furnace for collecting slag, and which receptacle may be shifted out of the furnace when required.

A still further object of the present invention, in its more specific use, is the provision of a slag collecting receptacle in the gas or air pockets of an open hearth furnace.

A still further object of the present invention is the provision of a closure in an open hearth furnace or in the gas or air chambers thereof which simultaneously would act as a receptacle for collecting and removing slag forming in the furnace or in the gas or air chambers thereof.

A still further object of the present invention is the provision of means for protecting the exposed edges of the receptacle when the latter remains within an open hearth furnace.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views:

Fig. 3 is a cross-sectional view on vertical plane, taken on line 3—3 of Fig. 1;

Fig. 4 is a fragmentary vertical cross-sectional view of the front end of the furnace with a device for removing the slag collecting receptacle from the furnace, the latter device being shown in a side elevational view;

Fig. 5 is an enlarged cross-sectional view of a housing protecting the lateral edge of the receptacle;

Fig. 6 is an enlarged cross-sectional view of a housing protecting the rear edge of the receptacle;

Fig. 7 is a longitudinal cross-sectional view on a reduced scale through the checker chamber and its cooperating gas chamber in an open hearth furnace, illustrating a modified use of the invention; and Fig. 8 is a transverse cross-sectional view, on an enlarged scale, taken on line 8—8 of Fig. 7.

Figure 1:
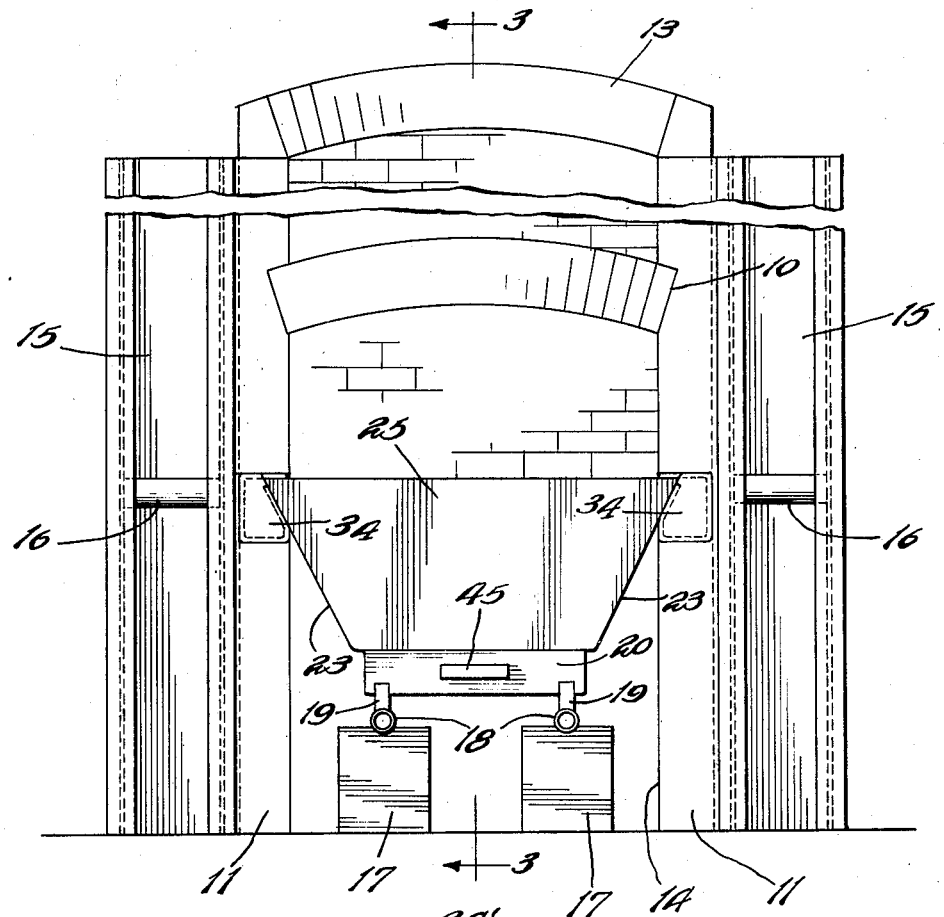
Fig. 1 is a front elevational view of the furnace.

Referring in detail to the present drawings there is shown therein an open hearth furnace including front wall 10, side walls 11, rear wall 12, and roof 13. These walls form a housing of an open hearth furnace. Front wall 10 does not extend to the very bottom of other vertical walls, but terminates short of the bottom, effecting an opening 14 which is defined by the lower edge of said front wall 10 and front ends of side walls 11.

The furnace is further provided at its front end and adjacent side walls 11 with I-beam standards 15 supporting horizontal bars 16 on each side of the furnace, for the purpose hereinafter stated.

Figure 2:
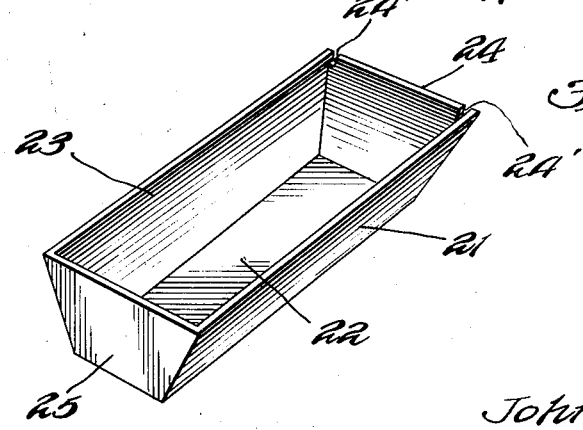
Fig. 2 is a perspective view of the receptacle employed in connection with an open hearth furnace.

Set upon the base of the furnace are two rows of a plurality of supporting blocks 17 for supporting a pair of parallelly arranged pipes or bars 18, for supporting thereon rails 19. Said rails 19 may be either integrally formed with base 20 or frictionally engaged within suitable recesses made in said base 20. Said base 20 is for the purpose of supporting receptacle, generally indicated by 21, and best shown in Fig. 2, and which receptacle consists of bottom wall 22, a pair of downwardly tapering side walls 23, downwardly tapering rear wall 24, and an upright front wall 25.

The inner faces of the several walls of receptacle 21 are lined with bricks or other suitable refractory material 26 for protecting receptacle 21, which may be made of metal, from oxidation or other action of the intense heat generated within the open hearth furnace and above said receptacle 21, when the same remains in an operative position within the furnace as seen in Figs. 1 and 3.

Built in side walls 11 and in the rear wall 12 is a water jacket generally indicated by 27, which is U-shaped on horizontal plane, the longitudinal leg portions of said water jacket being embedded within side walls 11, and the transverse rear portions whereof being built in the forwardly tapering lower portion 12' of the rear wall 12 of the furnace, as is clearly seen in Figs. 1 and 3. The inner faces of said water jacket 27 are exposed towards the center of the furnace.

Said water jacket 27 is substantially rectangular on vertical cross-section, for the purpose of defining a housing within which water may be contained as seen in Figs. 3, 5 and 6. The inner walls of the parallel leg portions of said water jacket 27 are longitudinally slit along the longitudinal lines adjacent the upper wall of the jacket as at 28 and these walls are thereupon bent towards the axial center of the jacket to define tapering wings 29, the degree of taper whereof corresponds to the degree of taper of the side walls 23 of receptacle 21. The upper portion of the inner side wall of the leg portions of jacket 27 defines lips 30 which are adapted to overhang the rim edges of the side walls 23 of the receptacle 21 and of the refractory material 26, as is clearly seen in Fig. 5.

The transverse rear portion of water jacket 27, which remains embedded within the tapering portion 12' of the rear wall 12 of the furnace is substantially similar to the construction of the parallel leg portions of said water jacket 27, hereinabove described, except that the former is devoid of lip 30. The inner wall of the former is slit along the plane corresponding to the plane of the underface of the upper wall of said rear portion of said jacket 27, as at 31. Said inner wall of the transverse rear portion of said jacket 27 is similarly inwardly bent to define a tapering wing 32, the taper of which corresponds to the taper of rear wall 24 of receptacle 21, as seen in Figs. 3 and 6.

In the operative position of receptacle 21 with respect to water jacket 27, the rim portion of the side walls 23 of receptacle 21 will rest within recesses defined by wings 29 and lips 30, the lateral edges of the outer shell of said receptacle 21 will rest upon said wings 29, as seen in Fig. 5, while the rim portion of rear wall 24 of said receptacle 21 will contact with wing 32. In each instance the rims of the lateral walls 23 and rear walls 24 will be disposed inwardly of water jacket 27. Said water jacket 27 is adapted to receive water indicated by 33 in Fig. 3.

The outer ends of parallel leg portions of said water jacket 27 are sealed by plates 34. A water circulating system may be provided for said water jacket 27 to supply a constant stream of water into said water jacket or to replenish the same with water during the operation of the open hearth furnace.

From the hereinabove description it will be seen that the heat generated within the furnace and above receptacle 21 when the same is in an operative position therewith, as seen in Fig. 3, will not be able to in any way affect said receptacle, because the rim edges thereof, including the edges of the refractory lining 26, are thoroughly protected by water jacket 27, wherein the temperature will be considerably lower, especially when constant circulation of water therewithin is brought about.

Referring to the means for withdrawing said receptacle 21 from within the furnace or to shift the same into the furnace, a device, best shown in Fig. 4, is provided, and the same consists of frame generally indicated by 35, which includes a pair of upper bars 36 the latter terminating in hooks 37 to engage bars 16. The frame further includes a plurality of uprights 38, which are connected by cross bars 39. Resting upon the latter is a pair of parallel supporting members 40, upon and below which a pair of shafts 41 may be supported. Said shafts carry a number of sprocket gears 42 which in turn carry a plurality of endless sprocket chains 43 which form an endless conveyor. Affixed to the said endless chain conveyer 43 is one or more hooks such as 44, to engage handle 45 formed at the front end of base 20. A motive power may be imparted to one of the shafts 41 to cause the shifting movement of endless chain conveyer 43. This will impart a pulling force upon hook 44 for pulling upon base 20 for shifting the same outwardly and upon supporting member 40. Necessarily said shifting movement will likewise be imparted to receptacle 21 and when the latter is completely withdrawn from the furnace and rests upon supporting members 40, any ashes or slag contained therewithin may be removed.

During the sliding movement of receptacle 21 out or into the furnace, base 20, by its rails 19 will slide upon bars 18. Said rails and bars 18 may be further provided with suitable anti-friction means to facilitate easier shifting.

For providing clearance of rear wall 24 of receptacle 21 past said lips 30 as said receptacle is shifted into or out of its operative position with respect to the furnace, recesses 24' are provided at the upper end of wall 24 and adjacent side walls 23 of said receptacle 21. Similar corresponding recesses are of course to be provided in the refractory lining 26.

From the hereinabove description it will be apparent that receptacle 21 not only provides removable means for collecting slag, but also forms a removable bottom for an open hearth furnace. Said receptacle 21, when in an operative position in the furnace, forms a seal for the bottom of the furnace. The side and rear walls of said receptacle 21 contact with the corresponding walls of the furnace through the medium of water jacket 27, while the upper edge of front wall 25 of the receptacle contacts will the lower end of the front wall 10 of the furnace.

While the hereinabove description relating to Figs. 1 to 6, both inclusive, refers to the use of the present invention in its most broad aspects, Figs. 7 and 8 illustrate a more specific use of the present invention. There is shown therein the ground floor of a furnace with an open hearth furnace proper 46 superimposed thereon. The ground floor of the furnace includes checker chamber 47 at the rear end of the furnace, known in the art as "kitchen side." In the checker chamber rows and piles of bricks 48 are laid forming a number of irregular passages through which gas, supplied through pipe 49 passes, and within which checker chamber the same is preheated before the same is allowed to pass to gas chamber 50 through opening 51 formed between partition wall 52 and ceiling 53. Said ceiling 53 forms the floor for the open hearth furnace proper. Above gas chamber 50 ceiling 53 is provided with gas port 54 through which the same passes into air mixing chamber above ceiling 53. A checker chamber similar to the gas checker chamber 46 is also provided for preheating air, which is allowed to pass through opening 51 into air chamber 55. Both gas and air chambers 50 and 55, respectively, are on the pit side of the open hearth furnace. The gas and air chambers 50 and 55 are known in the art as slag pockets.

Said chambers are further defined by side walls 56, longitudinal partition wall 57 and end wall 58. Supported adjacent the bottom of each chamber 50 and 55 is a slag collecting receptacle 59, resting upon base 60 and supported upon blocks 61. Pipes 62 rest upon said blocks 61. Welded, or otherwise rigidly affixed to said pipes 62 are rods 63, which form rails for base 60 and upon which the latter is adapted for sliding movement.

Receptacle 59 includes a tapering rear wall 64, which is provided adjacent its upper edge with a pair of opposed recesses 65, for the purpose hereinafter stated. Said receptacle 59 further includes tapering side walls 66, bottom wall 67 and a front wall 68. While the side and rear walls of said receptacle 59 are tapering, front wall 68 is vertical and remains in an alignment with the outer face of the end wall 58 of the furnace. The inner face of the receptacle is lined by refractory material 69, of substantially uniform thickness, except that adjacent the front wall 68 the refractory material is of a comparative thickness to provide block 70, having its inner face tapered, as at 71. Said block 70 at its upper end is of a thickness corresponding to the thickness of end wall 58, for the purpose of supporting thereon bricks or other suitable blocks 72 for closing the space defined by the lower edge of said wall 58 and upper end of said block 70 when receptacle 59 remains in an operative position within gas or air chambers 50 and 55, as the case may be, for shutting thereby the outside communication with the furnace when the same is in operation.

Partition wall 52 at its lower end is of a greater thickness than at its upper end, and is tapered as at 73, for contacting with the outer face of rear wall 64 of receptacle 59 when the same remains in an operative position shown in Fig. 7.

Embedded within walls 56, 57 and 52 is a U-shaped water jacket 74 of the construction shown in the preferred form of the invention, excepting that said water jacket 74 on its transverse cross-section is completely enclosed, and defines upwardly tapering and inwardly disposed groove or recess 75 of a width to completely enclose the rim portions of side walls 66 of receptacle 59 as well as the side portions of refractory material 69. The lateral leg portions of said water jacket 74 adjacent said groove or recess 75 has a downwardly depending lip portion 76 for which recesses 65 made in the rear wall 64 provide clearance when the receptacle is shifted into or out of its operative position. The transverse portion of water jacket 74, which is embedded in partition wall 52 is devoid of lip 76, as is seen in Fig. 7, for facilitating unobstructed entrance into a corresponding recess thereof for the upper rim portion of rear wall 64.

The side leg portion of water jacket 74 which remains embedded in side wall 56, and preferably at the free end thereof, adjacent end wall 58 connects with an inlet water supply pipe 77 which may lead outwardly of the side wall 56, as is seen in Fig. 8, and which pipe preferably connects with said water jacket at its lower wall. The outlet pipe 78 of a U-shaped formation may connect to adjacent side leg portions of two water jackets 74, one in chamber 50, the other in chamber 55, and preferably at the upper walls thereof, and which pipe may be embedded in the longitudinal partition wall 57 and may connect with an outlet manifold 79 leading forwardly of said partition wall 57 and thereupon extend through end wall 58 and to the outside thereof.

It will therefore be seen that water led into water jacket through pipe 77 will flow through the entire length of water jacket 74 and pass through pipe 78 and manifold 79 to the outside. Thus a circulation of water will be had in water jacket 74 of comparatively low temperature for protecting the upper edges of receptacle 59 which otherwise would be exposed to the action of high temperature within the gas or air chambers 50 and 55.

It is further observed that slag, which really is a liquid mass of molten brick will flow from the upper chambers of the open hearth furnace through port 54, as well as from and upon side walls of chambers 50 and 55 and will drop into receptacle 59 subject for removal when receptacle 59 is shifted outwardly and into its inoperative postion by a device such as is shown in Fig. 4.

While there is described herein a preferred embodiment of the present invention, it is nevertheless to be understood that minor changes may be made therein without departing from the spirit and scope of the invention as claimed.

What I claim as new is:

1. In a furnace including a plurality of vertical walls, a slag collecting device comprising a receptacle removably positioned within said walls, said receptacle when in an operative position defining in conjunction with said walls a heating chamber, and a water jacket upon said walls, said water jacket being provided with a recess for receiving therewithin the rim portion of said receptacle when the latter remains in an operative position within said walls.

2. In a furnace including a plurality of vertical walls, a slag collecting device comprising a receptacle removably supported within said walls, for defining in conjunction with said walls a heating chamber, the outer walls of said receptacle being upwardly tapered, and a water jacket upon said walls, the inner wall of said jacket being slit for defining a recess, portion of said slit wall being inwardly bent to define a tapered wing portion, the rim portion of said receptacle being receivable within said recess, and the adjacent upright wall portions thereof being adapted to contact with the wing portion of said water jacket for providing a seal therebetween.

3. In a furnace including a plurality of vertical walls, a slag collecting device comprising a receptacle removably positioned within said walls, and a water jacket in rigid engagement with said walls, said water jacket being provided at one of its walls with a recess for receiving therewithin the rim portion of said receptacle for providing a seal therebetween.

4. In a furnace including a plurality of vertical walls, a slag collecting device comprising a receptacle positioned within said walls, a water jacket in said walls, and means in said water jacket for engaging the rim portion of said receptacle for providing a protective cover thereto and a seal between said walls and said receptacle.

5. In a furnace including a slag pocket, one wall of said slag pocket terminating short of the remaining walls thereof, a slag collecting device comprising a receptacle removably positioned within said walls and below the termination of one of said walls, sealing means between said walls and said receptacle, and refractory lining in said receptacle, the refractory lining adjacent one of the walls of said receptacle being enlarged for defining a block normally in alignment with one of the said walls for providing a support for a closure within the space defined by the termination of one of said walls and said block.

6. In a furnace including a plurality of vertical walls, a slag collecting device comprising a receptacle removably positioned within said walls, the side walls of said receptacle being outwardly tapered, and a water jacket upon said first-named walls, said water jacket being provided upon its inner wall with an upwardly tapered recess for receiving therewithin in snug relation the rim portion of the walls of said receptacle when the latter remains in an operative position within said first-named walls.

JOHN MATELA.